United States Patent
Ricketts et al.

(10) Patent No.: US 9,718,507 B2
(45) Date of Patent: Aug. 1, 2017

(54) METHOD OF STEERING A WEIGHT TRANSFER AXLE ON A COMBINE

(71) Applicant: CNH Industrial America LLC, New Holland, PA (US)

(72) Inventors: Johnathan E. Ricketts, Coal Valley, IL (US); John J. Borsdorf, LeClaire, IA (US)

(73) Assignee: CNH Industrial America LLC, New Holland, PA (US)

( * ) Notice: Subject to any disclaimer, the term of this patent is extended or adjusted under 35 U.S.C. 154(b) by 38 days.

(21) Appl. No.: 14/926,974

(22) Filed: Oct. 29, 2015

(65) Prior Publication Data
US 2017/0120973 A1   May 4, 2017

(51) Int. Cl.
| | | |
|---|---|---|
| *B62D 61/12* | (2006.01) | |
| *A01B 69/00* | (2006.01) | |
| *A01D 41/02* | (2006.01) | |
| *B62D 13/00* | (2006.01) | |

(52) U.S. Cl.
CPC ............ *B62D 61/125* (2013.01); *A01B 69/00* (2013.01); *A01D 41/02* (2013.01); *B62D 13/005* (2013.01); *B62D 61/12* (2013.01)

(58) Field of Classification Search
CPC .... B62D 61/12; B62D 61/125; B62D 13/005; B62D 7/02; B62D 7/04; A01B 69/00; A01B 69/003; A01B 69/006
USPC ...................................................... 280/86.5
See application file for complete search history.

(56) References Cited

U.S. PATENT DOCUMENTS

| | | | | |
|---|---|---|---|---|
| 2,132,580 | A * | 10/1938 | Runyan ................ | B62D 13/005 280/682 |
| 2,974,976 | A * | 3/1961 | Lyall ................... | B60G 17/052 180/22 |
| 3,704,896 | A | 12/1972 | Buelow | |
| 3,838,885 | A * | 10/1974 | Brennan .............. | B62D 61/125 280/81.1 |
| 3,903,979 | A * | 9/1975 | Perrotin .................. | B60G 3/00 180/23 |
| 4,046,218 | A * | 9/1977 | Blaisdell ................. | B60G 9/02 180/435 |

(Continued)

FOREIGN PATENT DOCUMENTS

DE       10240236 A1    3/2004

OTHER PUBLICATIONS

European Search Report; 16196476.2-1656; Mar. 13, 2017.

*Primary Examiner* — Barry Gooden, Jr.
(74) *Attorney, Agent, or Firm* — Patrick M. Sheldrake

(57) ABSTRACT

An agricultural harvester has a chassis, a non-steerable driving front axle and a rear steering axle with a steering mechanism attached to the chassis. A steerable weight transfer axle has a rear steering axle to weight transfer axle linkage assembly linking the steerable weight transfer axle to the steering mechanism of the rear steering axle. The linkage assembly operates to steer the steerable weight transfer axle in coordination with the rear steering axle. The rear steering axle to weight transfer axle linkage assembly has a rear steer axle pivot arm pivotally connected to the rear steering axle and linked to the steering mechanism of the rear steering axle. The rear steering axle to weight transfer axle linkage assembly also has a reversing pivot linked to the rear steer axle pivot arm and to the steerable weight transfer axle.

20 Claims, 5 Drawing Sheets

(56) References Cited

U.S. PATENT DOCUMENTS

| | | | |
|---|---|---|---|
| 4,078,626 A | 3/1978 | Weichel | |
| 4,373,738 A | 2/1983 | Lange | |
| 4,762,421 A * | 8/1988 | Christenson | B60G 11/14 |
| | | | 180/209 |
| 4,856,814 A | 8/1989 | Jones | |
| 5,035,439 A * | 7/1991 | Petrillo | B60G 5/04 |
| | | | 280/149.2 |
| 5,897,123 A | 4/1999 | Cherney et al. | |
| 5,996,722 A * | 12/1999 | Price | B62D 7/1509 |
| | | | 180/234 |
| 6,007,078 A * | 12/1999 | Gottschalk | B60G 7/02 |
| | | | 280/81.6 |
| 6,062,578 A * | 5/2000 | Richardson | B60G 11/28 |
| | | | 280/81.6 |
| 6,186,266 B1 * | 2/2001 | Marchant | B62D 7/144 |
| | | | 180/236 |
| 6,419,247 B1 * | 7/2002 | Moran | B62D 53/045 |
| | | | 280/476.1 |
| 6,789,379 B2 | 9/2004 | Heidjann et al. | |
| 6,843,046 B2 | 1/2005 | Heidjann et al. | |
| 7,131,652 B2 * | 11/2006 | Ramsey | B60G 9/00 |
| | | | 280/124.153 |
| 7,398,981 B1 * | 7/2008 | Ener | B62D 61/12 |
| | | | 280/43.17 |
| 7,770,906 B2 * | 8/2010 | Koenigstein | B62D 7/144 |
| | | | 180/209 |
| 8,128,107 B2 * | 3/2012 | Koenigstein | B60G 9/02 |
| | | | 180/209 |
| 8,523,202 B1 * | 9/2013 | Strong | B62D 61/12 |
| | | | 180/209 |
| 8,523,203 B1 * | 9/2013 | Strong | B62D 61/12 |
| | | | 180/24.02 |
| 9,313,950 B2 * | 4/2016 | Ricketts | A01D 41/1243 |
| 2002/0033585 A1 * | 3/2002 | Konop | B62D 61/12 |
| | | | 280/86.5 |
| 2004/0188971 A1 * | 9/2004 | Rudder | B60G 11/04 |
| | | | 280/124.111 |
| 2005/0077703 A1 * | 4/2005 | Tango | B62D 13/04 |
| | | | 280/442 |
| 2009/0032273 A1 * | 2/2009 | Hahn | A01B 69/006 |
| | | | 172/2 |
| 2009/0236823 A1 * | 9/2009 | Prem | B62D 13/005 |
| | | | 280/426 |
| 2011/0273003 A1 * | 11/2011 | Mackin | A01D 41/12 |
| | | | 301/128 |
| 2013/0049316 A1 | 2/2013 | Schwinn et al. | |
| 2015/0266507 A1 * | 9/2015 | Westnedge | B62D 7/144 |
| | | | 280/93.502 |
| 2017/0015371 A1 * | 1/2017 | Strong | B62D 53/04 |

* cited by examiner

METHOD OF STEERING A WEIGHT TRANSFER AXLE ON A COMBINE

BACKGROUND OF THE INVENTION

1. Field of the Invention

The present invention relates to an agricultural harvesters such as combines, and, more particularly, to an agricultural harvester having an additional weight transfer axle that is steerable in coordination with the rear steering axle.

2. Description of the Related Art

An agricultural harvester known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

In order to support the weight of the header, which is cantilevered forward of the combine, and in order to support the weight of the machinery and grain load of the combine itself, combines use a heavy solid non-steering front axle. In order to provide steering, the rear axle of the combine is a steerable axle, which is commonly actuated by one or more hydraulic actuators. This rear steering arrangement further provides excellent maneuverability of the combine header, allowing an operator to easily align the header with the crop being harvested.

However, when the header is removed from the combine, such as to configure the combine for on-road travel, a significant amount of weight is transferred to the rear steering axle. While the capacity of this rear steering axle is adequate for field operations, even with the header removed from the combine, the increasing size and weight of combines has resulted in rear steering axle loads with the header of the combine removed that are at or above the maximum axle weight allowable on road according to regulations. Furthermore, the overall combine may be at or above the maximum weight allowable on road for a vehicle with two axles.

In order to compensate for this, it is known to provide an additional rear axle, such as a tag axle, behind the rear steering axle of a combine. This tag axle, or weight transfer axle, may be lowered to engage the ground and provide additional support and weight distribution, particularly when the header is removed from the combine. The weight transfer axle may further be raised when the header is attached to the combine and the additional support and weight distribution is not needed. The weight transfer axle may be passively steerable, such that it is built with caster so that when the combine is steered using the rear steering axle, the weight transfer axle wheels passively swivel to follow the rear steering axle. However, this arrangement is susceptible to wear and tear, due at least in part to the weight transfer axle passively following the rear steering axle imperfectly, resulting in tire scrub and high forces on the weight transfer axle and its support structure. Furthermore, the weight transfer axle must be lifted when the combine is moved in a rearward direction, as the same caster geometry that allows the weight transfer axle wheels to passively swivel and follow the rear steering axle when moving forward, causes the weight transfer axle wheels to swivel inappropriately when the combine is moved in a rearward direction.

What is needed is a method of controllably steering a weight transfer axle. The method needs to be robust and easily adaptable to existing vehicle structures. The method needs to further accommodate articulation of the rear steering axle and weight transfer axle, while allowing the weight transfer axle to be raised and lowered as required.

SUMMARY OF THE INVENTION

Embodiments of the present invention provide such a method of controllably steering a steerable weight transfer axle. The present invention utilizes a rear steering axle to weight transfer axle linkage assembly that is easily adaptable to existing vehicle structures, without requiring extensive redesign of the rear steering axle, the steerable weight transfer axle, or the structures to which these axles are attached. The present invention is robust and accommodates articulation of the rear steering axle and steerable weight transfer axle, while allowing the steerable weight transfer axle to be raised and lowered as required.

The rear steering axle to weight transfer axle linkage assembly is usable with a rear steering axle that uses a single steering cylinder connected to the steering knuckles using steering cylinder connecting links, or is usable with a rear steering axle that uses dual steering cylinders and a tie rod. The rear steering axle to weight transfer axle linkage assembly provides precise and positive steering correlation between the rear steering axle and the steerable weight transfer axle. One embodiment of the present invention further provides a rear steer axle master cylinder and a weight transfer axle slave cylinder in order to transmit force necessary to steer the ground engaging wheels of the steerable weight transfer axle. This is accomplished by transmitting the force imparted by the single steering cylinder of the rear steering axle, while retaining the rear steering axle to weight transfer axle linkage assembly in order to provide the precise and positive steering correlation between the rear steering axle and the steerable weight transfer axle.

The invention in one form is directed to an agricultural harvester having a chassis, a non-steerable driving front axle attached to the chassis, and a rear steering axle attached to the chassis and having a steering mechanism. A steerable weight transfer axle is connected to the chassis. A rear steering axle to weight transfer axle linkage assembly links the steerable weight transfer axle to the steering mechanism of the rear steering axle, and is operable to steer the steerable weight transfer axle in coordination with the rear steering axle. The rear steering axle to weight transfer axle linkage assembly has a rear steer axle pivot arm pivotally connected to the rear steering axle and linked to the steering mechanism of the rear steering axle. The rear steering axle to weight transfer axle linkage assembly also has a reversing pivot linked to the rear steer axle pivot arm and to the steerable weight transfer axle.

The invention in another form is directed to a steerable weight transfer axle arrangement for an agricultural harvester having a chassis, a non-steerable driving front axle attached to the chassis, and a rear steering axle attached to the chassis and having a steering mechanism. The steerable weight transfer axle arrangement includes a steerable weight transfer axle connected to the chassis. A rear steering axle to weight transfer axle linkage assembly links the steerable weight transfer axle to the steering mechanism of the rear steering axle, and is operable to steer the steerable weight transfer axle in coordination with the rear steering axle. The rear steering axle to weight transfer axle linkage assembly has a rear steer axle pivot arm pivotally connected to the rear steering axle and linked to the steering mechanism of the rear steering axle. The rear steering axle to weight transfer axle linkage assembly also has a reversing pivot linked to the rear steer axle pivot arm and to the steerable weight transfer axle.

The invention in another form is directed to a method of steering a weight transfer axle of an agricultural harvester having a chassis, a non-steerable driving front axle attached to the chassis, and a rear steering axle attached to the chassis and having a steering mechanism. The method includes several steps. The first step is connecting a steerable weight transfer axle to the chassis. The second step is linking a rear steering axle to weight transfer axle linkage assembly to the steering mechanism of the rear steering axle and to the steerable weight transfer axle. The rear steering axle to weight transfer axle linkage assembly is operable to steer the steerable weight transfer axle in coordination with the rear steering axle. The rear steering axle to weight transfer axle linkage assembly has a rear steer axle pivot arm pivotally connected to the rear steering axle and linked to the steering mechanism of the rear steering axle. The rear steering axle to weight transfer axle linkage assembly also has a reversing pivot linked to the rear steer axle pivot arm and to the steerable weight transfer axle.

One advantage of the present invention is that it provides a method of controllably steering a steerable weight transfer axle, thereby minimizing tire scrub, and making it possible to operate the combine in reverse without having to raise the steerable weight transfer axle.

Another advantage is that the present invention is robust and accommodates articulation of the rear steering axle and steerable weight transfer axle, and is easily adaptable to existing vehicle structures.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
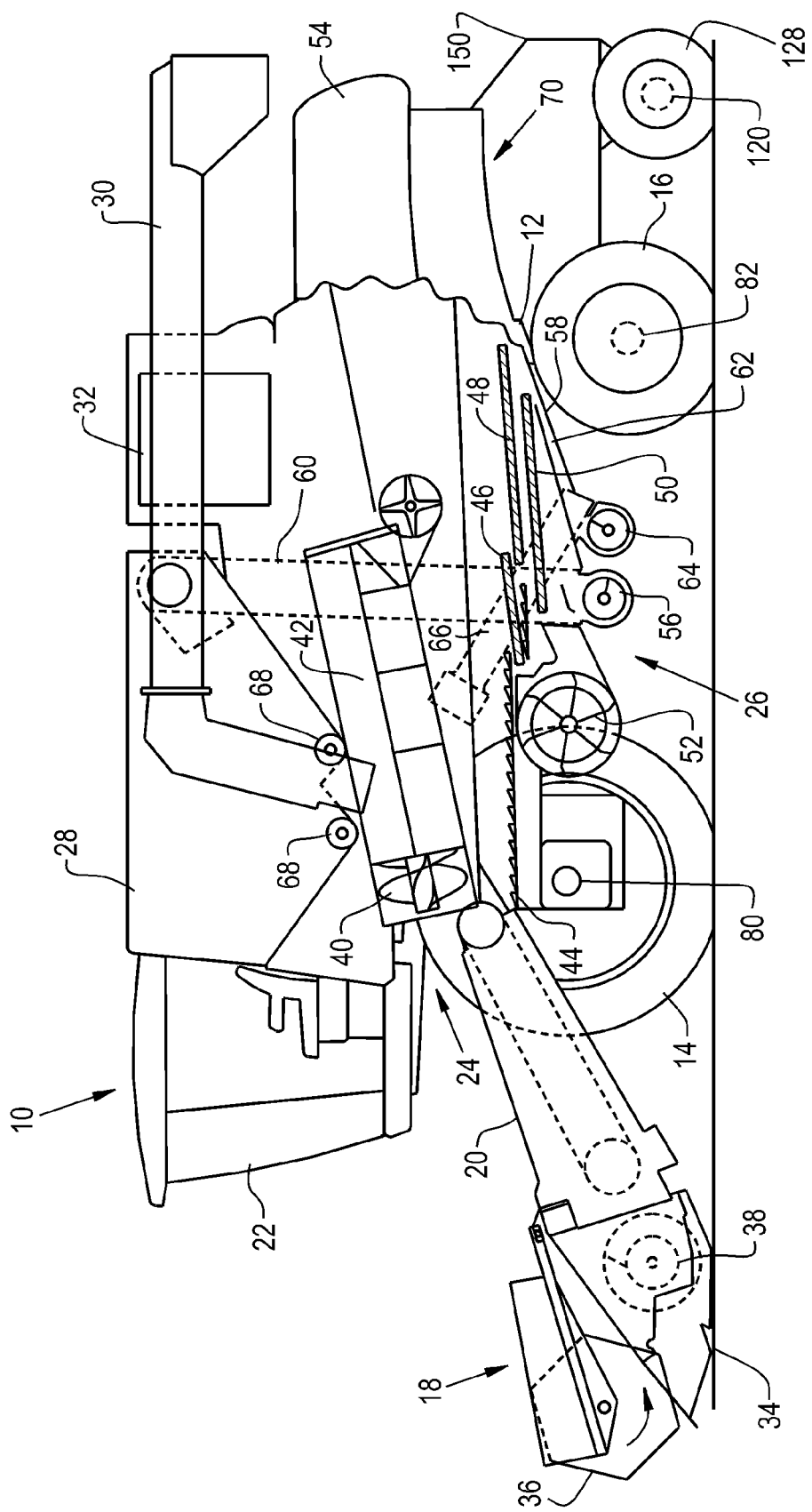
FIG. 1 illustrates a side view of a combine with an attached header and a steerable weight transfer axle according to one embodiment of the present invention.
Figure 2:
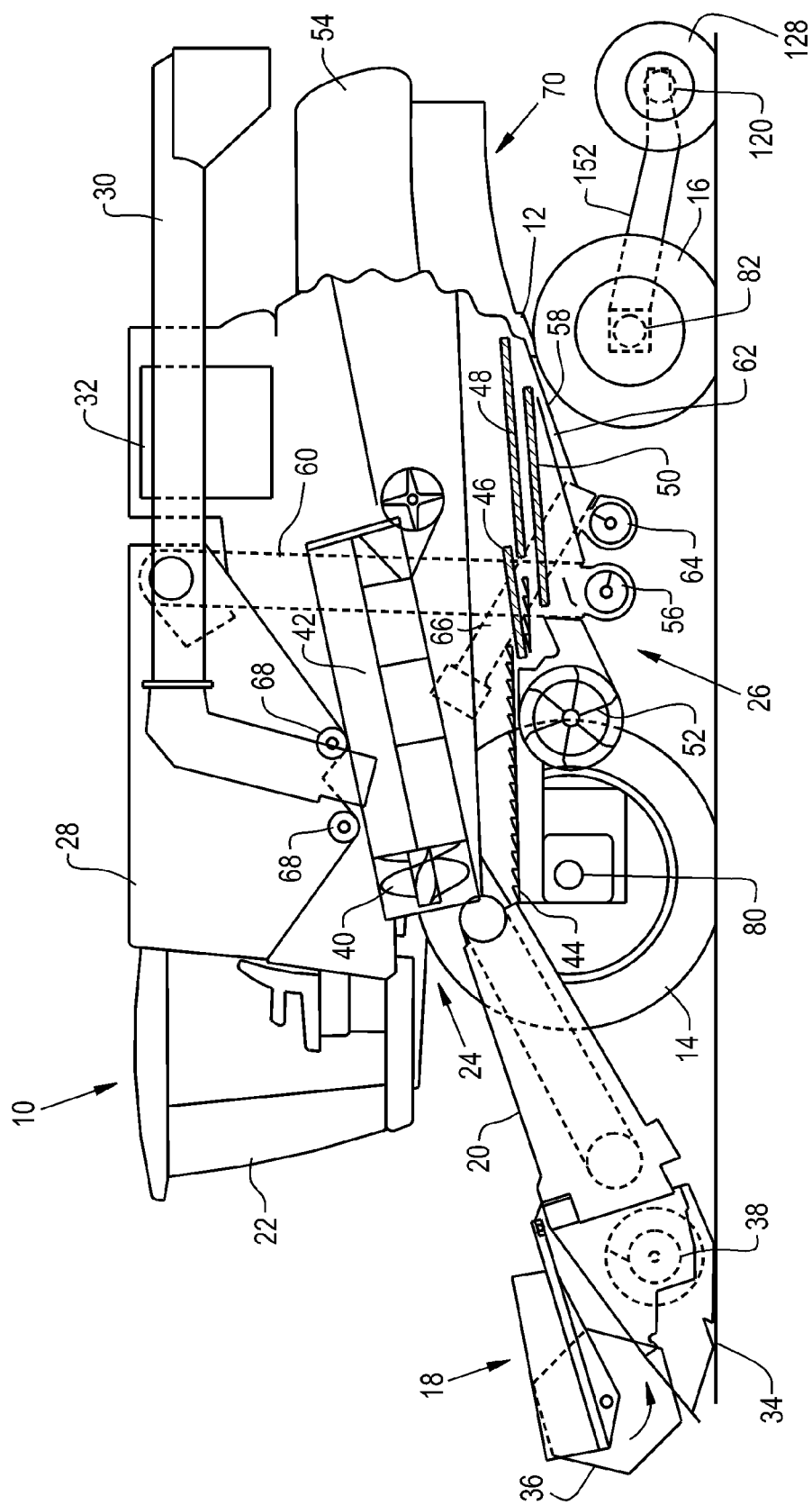
FIG. 2 illustrates a side view of a combine with an attached header and a steerable weight transfer axle according to another embodiment of the present invention.

Referring now to the drawings, and more particularly to FIGS. 1 and 2, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

The front ground engaging wheels 14 are attached to a non-steerable driving front axle 80. The rear ground engaging wheels 16 are attached to a rear steering axle 82. Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is removably mounted to the front of the combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain that has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52, which provides an airflow through the sieves, to remove chaff and other impurities such as dust from the grain by making this material airborne for discharge from straw hood 54 of residue handling system 70 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Each combine 10 shown in FIGS. 1 and 2 is further provided with an additional steerable weight transfer axle 120 having ground engaging wheels 128. The steerable weight transfer axle 120 may provide additional support to the combine 10 through a weight transfer axle support structure 150, as shown in FIG. 1. Alternately, the steerable weight transfer axle 120 may provide additional support to the combine through the rear steering axle 82 by way of a weight transfer axle to rear steer axle interconnecting structure 152, as shown in FIG. 2. In the case of either embodiment, the steerable weight transfer axle 120 may or may not be liftable. In other words, the steerable weight transfer axle 120 may be raised, thereby disengaging the ground engaging wheels 128 from the ground, using hydraulics, pneumatics, or other arrangements.

Figure 3:
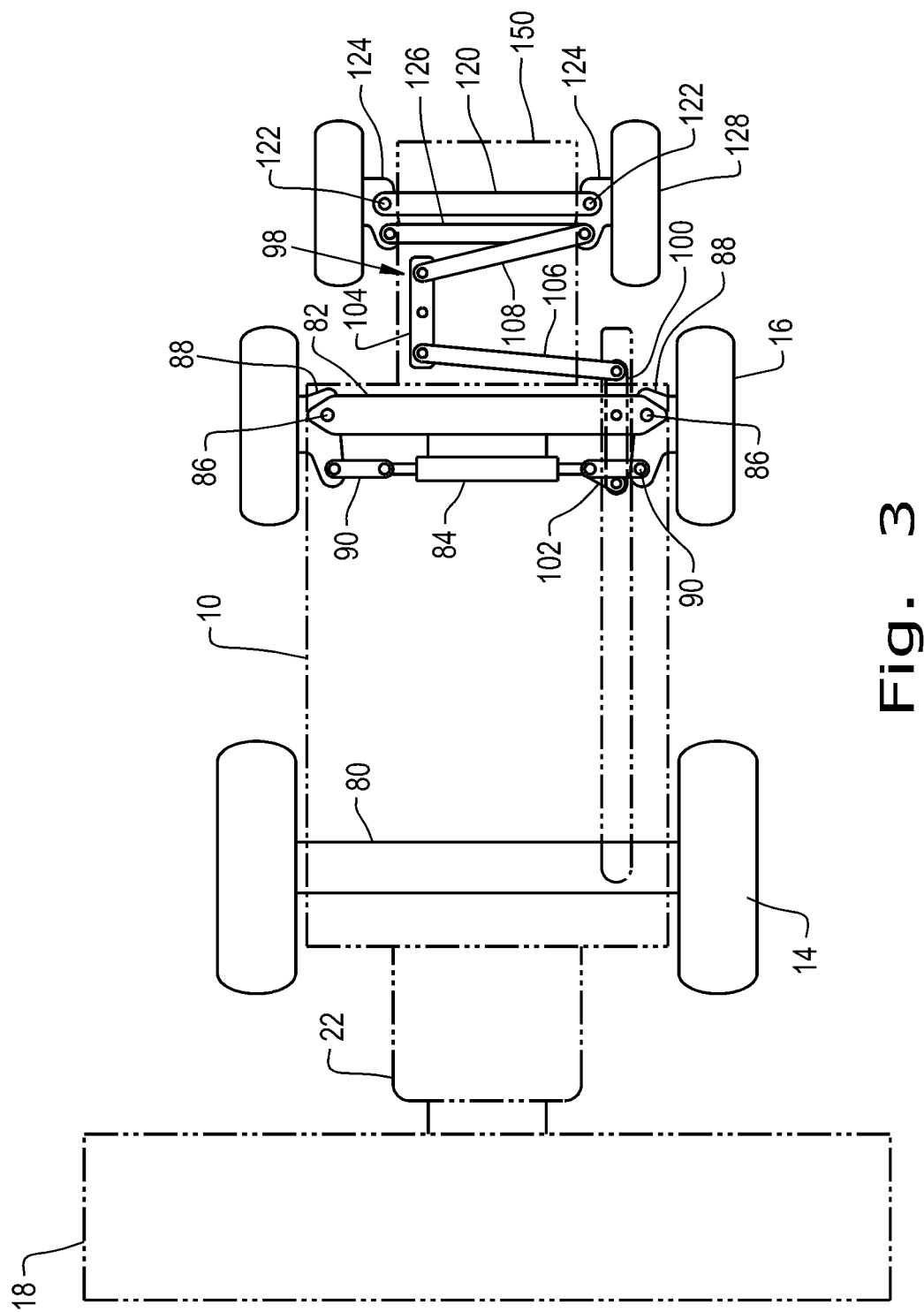
FIG. 3 illustrates a diagram showing an interconnected steering linkage arrangement between the rear steer axle and the steerable weight transfer axle according to an embodiment of the invention.

Now, additionally referring to FIG. 3, according to an aspect of the present invention, a method of steering the steerable weight transfer axle 120 is provided. The combine 10, including operator cab 22 and header 18, is shown in broken line representation, revealing the non-steerable driving front axle 80 with ground engaging wheels 14, the rear steering axle 82 with ground engaging wheels 16, and the steerable weight transfer axle 120 with ground engaging wheels 128. Each ground engaging wheel 16 of the rear steering axle 82 is connected to a steering knuckle 88, which is pivotally connected to the rear steering axle 82 by way of a kingpin 86. A single steering cylinder 84 is connected to both steering knuckles 88 by way of steering cylinder connecting links 90. The single steering cylinder 84 provides coordinated control of the steering knuckles 88 through the steering cylinder connecting links 90, thereby providing steering of the combine 10.

Each ground engaging wheel 128 of the steerable weight transfer axle 120 is similarly connected to a steering knuckle 124, which is again pivotally connected to the steerable weight transfer axle 120 by way of a kingpin 122. Pivotal movement of the steering knuckles 124 is coordinated by a tie rod 126. Pivotal movement of the steering knuckles 124 of the steerable weight transfer axle 120 is linked to pivotal movement of the steering knuckles 88 of the rear steering axle 82 by way of a rear steering axle to weight transfer axle linkage assembly 98. The rear steering axle to weight transfer axle linkage assembly 98 includes a rear steer axle pivot arm 100, which is pivotally attached near its midpoint to the rear steering axle 82, and a reversing pivot 104, which may be pivotally attached near its midpoint to the weight transfer axle support structure 150, to the weight transfer axle to rear axle interconnecting structure 152, or to another part of the combine 10, such as the chassis 12 (not shown).

In the embodiment shown in FIG. 3, the rear steer axle pivot arm 100 is shown pivotally attached to the rear steering axle 82 near the left end of the rear steering axle 82, and the reversing pivot 104 is shown pivotally attached for example to the weight transfer axle support structure 150 on the right. However, it is understood that this arrangement may be reversed from right to left, so that the rear steer axle pivot arm 100 is attached to the rear steering axle 82 near the right end of the rear steering axle 82, and the reversing pivot 104 is pivotally attached for example to the weight transfer axle support structure 150 on the left.

The rear steer axle pivot arm 100 is connected to the single steering cylinder 84 by way of a pivot arm to steering cylinder link 102, which pivotally connects to the rear steer axle pivot arm 100 at its forward end. The rear steer axle pivot arm 100 is connected to the reversing pivot 104 by way of a rear steer axle pivot arm to reversing pivot link 106. The rear steer axle pivot arm to reversing pivot link 106 pivotally connects to the rear steer axle pivot arm 100 at its rearward end, and pivotally connects to the reversing pivot 104 at its forward end. The reversing pivot 104 is connected to one of the steering knuckles 124 of the steerable weight transfer axle 120 or to the tie rod 126 of the steerable weight transfer axle 120 by way of a reversing pivot to weight transfer axle link 108. The reversing pivot to weight transfer axle link 108 pivotally connects to the reversing pivot 104 at its rearward end, and pivotally connects to one of the steering knuckles 124 of the steerable weight transfer axle 120 or to the tie rod 126 of the steerable weight transfer axle 120.

In this way, when the combine 10 turns left, for example, the single steering cylinder 84 of the rear steering axle 82 pivots the steering knuckles 88 clockwise about kingpins 86, as viewed in FIG. 3, acting through the steering cylinder connecting links 90. The rear steer axle pivot arm 100 also pivots clockwise about its midpoint pivotal connection to the rear steering axle 82, such motion being imparted by the single steering cylinder 84 acting through the pivot arm to steering cylinder link 102. The rear steer axle pivot arm to reversing pivot link 106 then causes the reversing pivot 104 to pivot counter-clockwise about its midpoint pivotal connection for example to the weight transfer axle support structure 150. The reversing pivot to weight transfer axle link 108 then causes the steering knuckles 124 of the steerable weight transfer axle 120 to pivot clockwise about kingpins 122, so that the rear steering axle 82 and the steerable weight transfer axle 120 steer in coordinated fashion. This coordinated steering between the rear steering axle 82 and the steerable weight transfer axle 120 minimizes tire scrub and excessive forces on the steerable weight transfer axle 120, and on the rear steering axle 82, and further makes it possible to move the combine 10 in reverse without lifting the steerable weight transfer axle 120.

Figure 4:
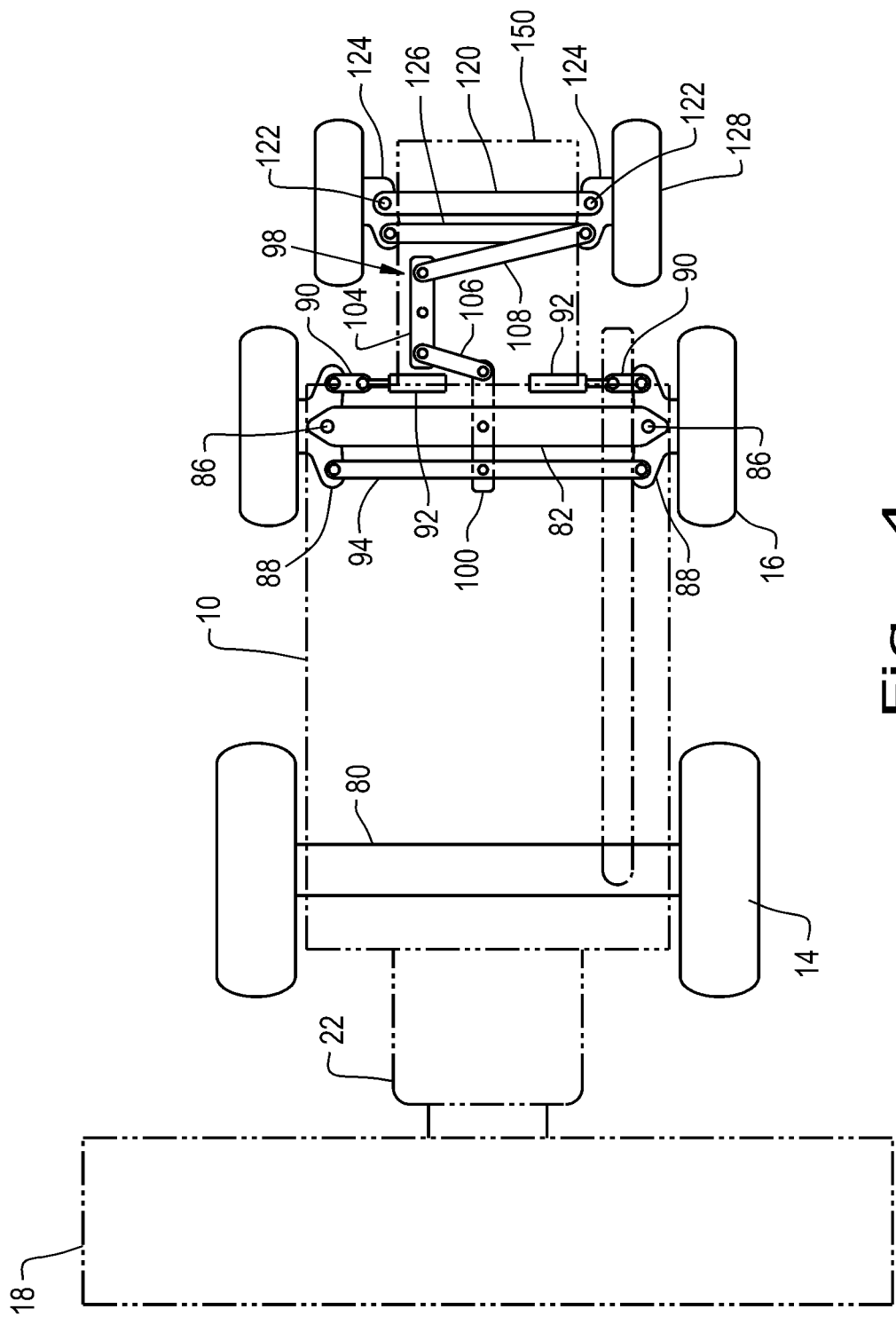
FIG. 4 illustrates a diagram showing an interconnected steering linkage arrangement between the rear steer axle and the steerable weight transfer axle according to another embodiment of the invention.

Turning now to FIG. 4, another embodiment of the present invention is provided. The combine 10, including operator cab 22 and header 18, is again shown in broken line representation, revealing the non-steerable driving front axle 80 with ground engaging wheels 14, the rear steering axle 82 with ground engaging wheels 16, and the steerable weight transfer axle 120 with ground engaging wheels 128. Each ground engaging wheel 16 of the rear steering axle 82 is again connected to a steering knuckle 88, which is pivotally connected to the rear steering axle 82 by way of a kingpin 86. In the case of the embodiment in FIG. 4, the single steering cylinder 84 is replaced with dual steering cylinders 92 that connect to the steering knuckles 88 by way of steering cylinder connecting links 90. The two steering knuckles 88 of the rear steering axle 82 are connected by a rear axle tie rod 94 that coordinates the pivoting motion of the two steering knuckles 88. The rear steer axle pivot arm 100 is again pivotally attached near its midpoint to the rear steering axle 82. In the embodiment of the present invention shown in FIG. 4, the rear steer axle pivot arm 100 is pivotally connected at its forward end to the tie rod 94.

The ground engaging wheels 128 of the steerable weight transfer axle 120 are again connected to the steering knuckles 124, which are pivotally connected to the steerable weight transfer axle 120 by way of kingpins 122. Pivotal movement of the steering knuckles 124 is again coordinated by tie rod 126. Pivotal movement of the steering knuckles 124 of the steerable weight transfer axle 120 is again linked to pivotal movement of the steering knuckles 88 of the rear steering axle 82 by way of the rear steering axle to weight transfer axle linkage assembly 98. The rear steer axle pivot arm 100 is again connected to the reversing pivot 104 by way of the rear steer axle pivot arm to reversing pivot link 106. The rear steer axle pivot arm to reversing pivot link 106 again pivotally connects to the rear steer axle pivot arm 100 at its rearward end, and again pivotally connects to the reversing pivot 104 at its forward end. The reversing pivot 104 is again connected to one of the steering knuckles 124 of the steerable weight transfer axle 120 or to the tie rod 126 of the steerable weight transfer axle 120 by way of a reversing pivot to weight transfer axle link 108. The reversing pivot to weight transfer axle link 108 again pivotally connects to the reversing pivot 104 at its rearward end, and pivotally connects to one of the steering knuckles 124 of the steerable weight transfer axle 120 or to the tie rod 126 of the steerable weight transfer axle 120.

In the embodiment shown in FIG. 4, the reversing pivot 104 is shown pivotally attached for example to the weight transfer axle support structure 150 on the right. However, it is understood that this arrangement may be reversed from right to left, so that the reversing pivot 104 is pivotally attached for example to the weight transfer axle support structure 150 on the left.

In this way, when the combine 10 turns left, for example, the dual steering cylinders 92 of the rear steering axle 82 pivot the steering knuckles 88 clockwise about kingpins 86, as viewed in FIG. 4, acting through the steering cylinder connecting links 90. The rear steer axle pivot arm 100 also pivots clockwise about its midpoint pivotal connection to the rear steering axle 82, such motion being imparted by the tie rod 94. The rear steer axle pivot arm to reversing pivot link 106 then causes the reversing pivot 104 to pivot counterclockwise about its midpoint pivotal connection for example to the weight transfer axle support structure 150. The reversing pivot to weight transfer axle link 108 then causes the steering knuckles 124 of the steerable weight transfer axle 120 to pivot clockwise about kingpins 122, so that the rear steering axle 82 and the steerable weight transfer axle 120 steer in coordinated fashion.

Figure 5:
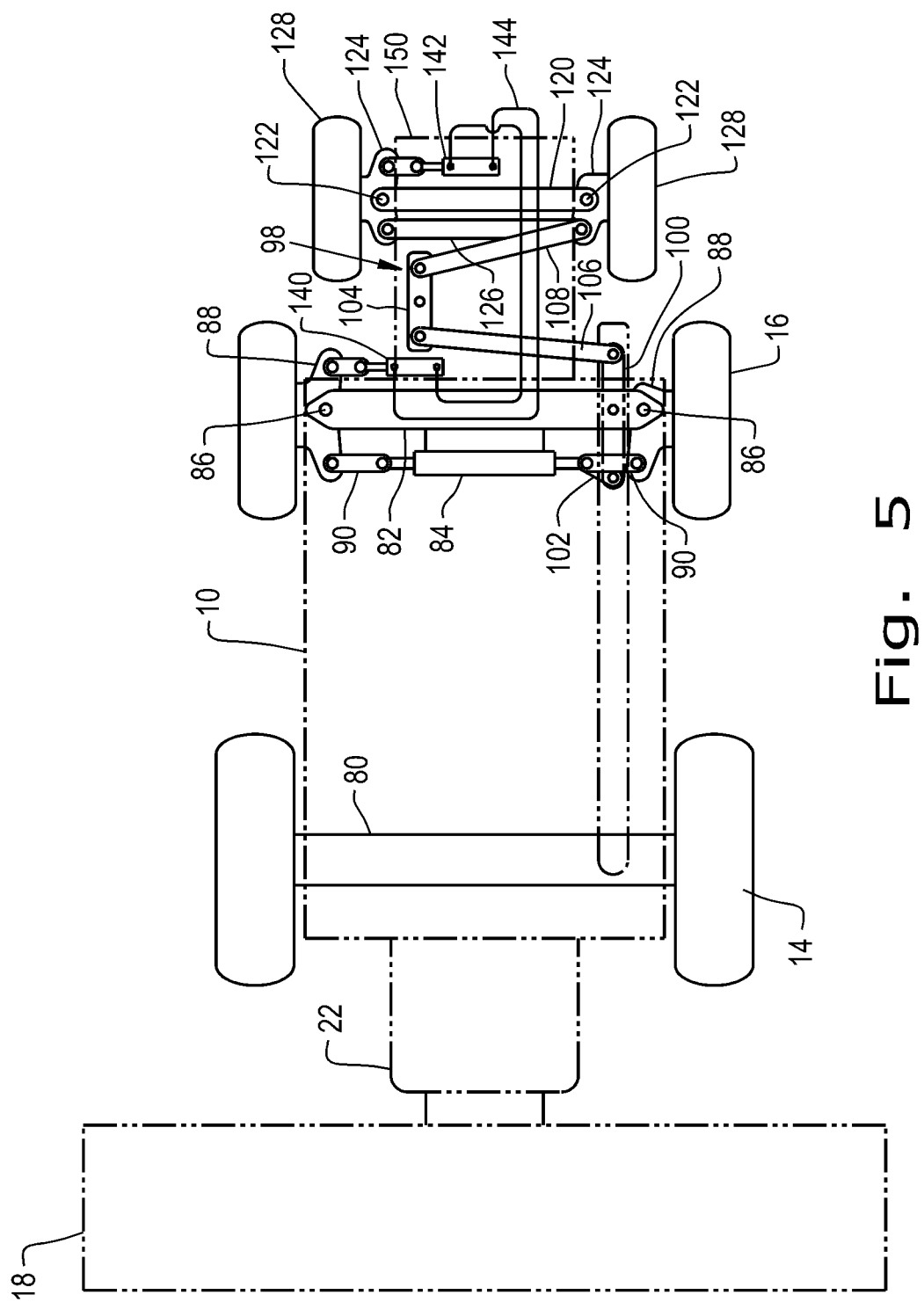
FIG. 5 illustrates a diagram showing an interconnected steering linkage arrangement between the rear steer axle and the steerable weight transfer axle according to another embodiment of the invention.

Turning now to FIG. 5, another embodiment of the present invention is provided. The combine 10, cab 22, and header 18 are again shown in broken line representation, revealing the non-steerable driving front axle 80 with ground engaging wheels 14, the rear steering axle 82 with ground engaging wheels 16, and the steerable weight transfer axle 120 with ground engaging wheels 128. A single steering cylinder 84 is again connected to both steering knuckles 88 by way of steering cylinder connecting links 90, by which arrangement the steering knuckles 88 are pivoted about kingpins 86, thereby steering ground engaging wheels 16.

Steerable weight transfer axle 120 is again provided with ground engaging wheels 128 attached to steering knuckles 124, which are pivotally connected to the steerable weight transfer axle 120 by way of kingpins 122, and coordinated in their pivoting motion by tie rod 126. Pivotal movement of the steering knuckles 124 of the steerable weight transfer axle 120 is again linked to pivotal movement of the steering knuckles 88 of the rear steering axle 82 by way of a rear steering axle to weight transfer axle linkage assembly 98, which again includes a rear steer axle pivot arm 100, which is pivotally attached near its midpoint to the rear steering axle 82, and a reversing pivot 104, which may be pivotally attached near its midpoint to the weight transfer axle support structure 150, to the weight transfer axle to rear axle interconnecting structure 152, or to another part of the combine 10, such as the chassis 12 (not shown).

The rear steer axle pivot arm 100 is again pivotally connected at its forward end to the single steering cylinder 84 by way of a pivot arm to steering cylinder link 102. The rear steer axle pivot arm 100 is again connected to the reversing pivot 104 by way of a rear steer axle pivot arm to reversing pivot link 106, which again pivotally connects to the rear steer axle pivot arm 100 at its rearward end, and pivotally connects to the reversing pivot 104 at its forward end. The reversing pivot 104 is again connected to one of the steering knuckles 124 of the steerable weight transfer axle 120 or to the tie rod 126 of the steerable weight transfer axle 120 by way of a reversing pivot to weight transfer axle link 108, which pivotally connects to the reversing pivot 104 at its rearward end, and pivotally connects to one of the steering knuckles 124 or to the tie rod 126 of the steerable weight transfer axle 120.

The embodiment of the invention shown in FIG. 5 is further provided with a rear steer axle master cylinder 140 connected to one of the steering knuckles 88 of the rear steering axle 84. A weight transfer axle slave cylinder 142 is connected to one of the steering knuckles 124 of the steerable weight transfer axle 120. A master cylinder to slave cylinder hydraulic connection 144 is connected to the rear steer axle master cylinder 140 and to the weight transfer axle slave cylinder 142 in such a way that extension of the rear steer axle master cylinder 140, as when the embodiment of the invention shown in FIG. 5 is steered to the right, displaces fluid from the rear steer axle master cylinder 140 to the weight transfer axle slave cylinder 142, causing the weight transfer axle slave cylinder 142 to also extend. Conversely, when the rear steer axle master cylinder 140 retracts, as when the embodiment of the invention shown in FIG. 5 is steered to the left, fluid is displaced from the rear steer axle master cylinder 140 to the weight transfer axle slave cylinder 142, causing the weight transfer axle slave cylinder 142 to also retract.

In this way, the rear steer axle master cylinder 140, the weight transfer axle slave cylinder 142, and the master cylinder to slave cylinder hydraulic connection 144 cooperate to provide a large part of the force necessary to steer the ground engaging wheels 128 of the steerable weight transfer axle 120 by transmitting the force imparted by the single steering cylinder 84 of the rear steering axle 82. Meanwhile, the rear steering axle to weight transfer axle linkage assembly 98 provides the positive and precise steering correlation between the rear steering axle 82 and the steerable weight transfer axle 120, which might otherwise be lost due to the rear axle master cylinder 140 and the weight transfer axle slave cylinder 142 becoming misaligned due to leaking seals or other causes.

In the embodiment shown in FIG. 5, the rear steer axle pivot arm 100 is shown pivotally attached to the rear steering axle 82 near the left end of the rear steering axle 82, the reversing pivot 104 is shown pivotally attached for example to the weight transfer axle support structure 150 on the right, and both the rear axle master cylinder 140 and the weight transfer axle slave cylinder 142 are shown on the right of the rear steering axle 82 and the steerable weight transfer axle 120, respectively. However, it is understood that this arrangement may be reversed from right to left, so that the rear steer axle pivot arm 100 is attached to the rear steering axle 82 near the right end of the rear steering axle 82, the reversing pivot 104 is pivotally attached for example to the weight transfer axle support structure 150 on the left, and both the rear axle master cylinder 140 and the weight transfer axle slave cylinder 142 are on the left of the rear steering axle 82 and the steerable weight transfer axle 120, respectively.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
    a chassis;
    a non-steerable driving front axle attached to said chassis;
    a rear steering axle attached to said chassis and having a steering mechanism;
    a steerable weight transfer axle connected to said chassis; and
    a rear steering axle to weight transfer axle linkage assembly, said steerable weight transfer axle being linked to said steering mechanism of said rear steering axle by way of said rear steering axle to weight transfer axle linkage assembly, said rear steering axle to weight transfer axle linkage assembly operable to steer said steerable weight transfer axle in coordination with said rear steering axle;
        said rear steering axle to weight transfer axle linkage assembly having a rear steer axle pivot arm pivotally connected to said rear steering axle and linked to said steering mechanism of said rear steering axle; and
        said rear steering axle to weight transfer axle linkage assembly having a reversing pivot, said reversing pivot being linked to said rear steer axle pivot arm and to said steerable weight transfer axle.

2. The agricultural harvester of claim 1, wherein:
    said steering mechanism of said rear steering axle having a single steering cylinder, said rear steer axle pivot arm of said rear steering axle to weight transfer axle linkage assembly being linked to said single steering cylinder using a pivot arm to steering cylinder link.

3. The agricultural harvester of claim 1, wherein:
    said steering mechanism of said rear steering axle having at least one steering cylinder and a tie rod, said rear steer axle pivot arm of said rear steering axle to weight transfer axle linkage assembly being linked to said tie rod.

4. The agricultural harvester of claim 1, wherein:
    said steerable weight transfer axle being connected to said chassis through a weight transfer axle support structure; and
    said reversing pivot of said rear steering axle to weight transfer axle linkage assembly being pivotally connected to said weight transfer axle support structure.

5. The agricultural harvester of claim 1, wherein:
    said steerable weight transfer axle being connected to said chassis through said rear steering axle using a weight transfer axle to rear steer axle interconnecting structure; and
    said reversing pivot of said rear steering axle to weight transfer axle linkage assembly being pivotally connected to said weight transfer axle to rear steer axle interconnecting structure.

6. The agricultural harvester of claim 1, wherein:
    said steerable weight transfer axle is liftable.

7. The agricultural harvester of claim 1, further comprising:
    a master cylinder linked to said steering mechanism of said rear steering axle;
    a slave cylinder linked to said steerable weight transfer axle; and
    a master cylinder to slave cylinder hydraulic connection connected to said master cylinder and to said slave cylinder, said master cylinder, said slave cylinder, and said master cylinder to slave cylinder hydraulic connection cooperating to transmit steering force from said steering mechanism of said rear steering axle to said steerable weight transfer axle.

8. The agricultural harvester of claim 7, wherein:
    said master cylinder to slave cylinder hydraulic connection being connected to said master cylinder and to said slave cylinder so that fluid displaced from said master cylinder to said slave cylinder causes said slave cylinder to extend when said master cylinder is extended, and causes said slave cylinder to retract when said master cylinder is retracted.

9. A steerable weight transfer axle arrangement for an agricultural harvester having a chassis, a non-steerable driving front axle attached to the chassis, and a rear steering axle attached to the chassis and having a steering mechanism, comprising:
    a steerable weight transfer axle connected to the chassis; and
    a rear steering axle to weight transfer axle linkage assembly, said steerable weight transfer axle being linked to the steering mechanism of the rear steering axle by way of said rear steering axle to weight transfer axle linkage assembly, said rear steering axle to weight transfer axle linkage assembly operable to steer said steerable weight transfer axle in coordination with the rear steering axle;
        said rear steering axle to weight transfer axle linkage assembly having a rear steer axle pivot arm pivotally connected to the rear steering axle and linked to the steering mechanism of the rear steering axle; and said rear steering axle to weight transfer axle linkage assembly having a reversing pivot, said reversing pivot being linked to said rear steer axle pivot arm and to said steerable weight transfer axle.

10. The steerable weight transfer axle arrangement of claim 9, wherein:

the steering mechanism of the rear steering axle having a single steering cylinder, said rear steer axle pivot arm of said rear steering axle to weight transfer axle linkage assembly being linked to the single steering cylinder using a pivot arm to steering cylinder link.

11. The steerable weight transfer axle arrangement of claim 9, wherein:

the steering mechanism of the rear steering axle having at least one steering cylinder and a tie rod, said rear steer axle pivot arm of said rear steering axle to weight transfer axle linkage assembly being linked to the tie rod.

12. The steerable weight transfer axle arrangement of claim 9, wherein:

said steerable weight transfer axle being connected to the chassis through a weight transfer axle support structure; and said reversing pivot of said rear steering axle to weight transfer axle linkage assembly being pivotally connected to said weight transfer axle support structure.

13. The steerable weight transfer axle arrangement of claim 9, wherein:

said steerable weight transfer axle being connected to the chassis through the rear steering axle using a weight transfer axle to rear steer axle interconnecting structure; and said reversing pivot of said rear steering axle to weight transfer axle linkage assembly being pivotally connected to said weight transfer axle to rear steer axle interconnecting structure.

14. The steerable weight transfer axle arrangement of claim 9, wherein:

said steerable weight transfer axle is liftable.

15. The steerable weight transfer axle arrangement of claim 9, further comprising:

a master cylinder linked to the steering mechanism of the rear steering axle;

a slave cylinder linked to said steerable weight transfer axle; and a master cylinder to slave cylinder hydraulic connection connected to said master cylinder and to said slave cylinder, said master cylinder, said slave cylinder, and said master cylinder to slave cylinder hydraulic connection cooperating to transmit steering force from the steering mechanism of the rear steering axle to said steerable weight transfer axle.

16. The steerable weight transfer axle arrangement of claim 15, wherein:

said master cylinder to slave cylinder hydraulic connection being connected to said master cylinder and to said slave cylinder so that fluid displaced from said master cylinder to said slave cylinder causes said slave cylinder to extend when said master cylinder is extended, and causes said slave cylinder to retract when said master cylinder is retracted.

17. A method of steering a weight transfer axle of an agricultural harvester having a chassis, a non-steerable driving front axle attached to the chassis, and a rear steering axle attached to the chassis and having a steering mechanism, comprising the steps of:

connecting a steerable weight transfer axle to said chassis; and linking a rear steering axle to weight transfer axle linkage assembly to the steering mechanism of the rear steering axle and to said steerable weight transfer axle, said rear steering axle to weight transfer axle linkage assembly being operable to steer said steerable weight transfer axle in coordination with the rear steering axle;

said rear steering axle to weight transfer axle linkage assembly having a rear steer axle pivot arm pivotally connected to the rear steering axle and linked to the steering mechanism of the rear steering axle; and said rear steering axle to weight transfer axle linkage assembly having a reversing pivot, said reversing pivot being linked to said rear steer axle pivot arm and to said steerable weight transfer axle.

18. The method of claim 17, wherein:

said steerable weight transfer axle being connected to the chassis through a weight transfer axle support structure; and said reversing pivot of said rear steering axle to weight transfer axle linkage assembly being pivotally connected to said weight transfer axle support structure.

19. The method of claim 17, wherein:

said steerable weight transfer axle being connected to the chassis through the rear steering axle using a weight transfer axle to rear steer axle interconnecting structure; and said reversing pivot of said rear steering axle to weight transfer axle linkage assembly being pivotally connected to said weight transfer axle to rear steer axle interconnecting structure.

20. The method of claim 17, further comprising the steps of:

linking a master cylinder to the steering mechanism of the rear steering axle;

linking a slave cylinder to said steerable weight transfer axle;

connecting a master cylinder to slave cylinder hydraulic connection to said master cylinder and to said slave cylinder; and transmitting steering force from the steering mechanism of the rear steering axle to said steerable weight transfer axle using said master cylinder, said slave cylinder, and said master cylinder to slave cylinder hydraulic connection.

\* \* \* \* \*